United States Patent
Sato et al.

(10) Patent No.: US 6,933,079 B2
(45) Date of Patent: Aug. 23, 2005

(54) SEPARATOR FOR ALKALINE STORAGE BATTERY AND ALKALINE STORAGE BATTERY USING THE SAME

(75) Inventors: Naoto Sato, Kosai (JP); Katsunori Komori, Toyohashi (JP); Nobuyasu Morishita, Toyohashi (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 315 days.

(21) Appl. No.: 10/289,747

(22) Filed: Nov. 6, 2002

(65) Prior Publication Data

US 2003/0091903 A1 May 15, 2003

(30) Foreign Application Priority Data

Nov. 7, 2001 (JP) ........................................ 2001-341982

(51) Int. Cl.[7] .............................................. H01M 2/16
(52) U.S. Cl. ........................ 429/249; 429/254; 429/142; 429/129
(58) Field of Search .................................. 429/249, 247, 429/250, 254, 142, 129

(56) References Cited

U.S. PATENT DOCUMENTS

2002/0187400 A1 * 12/2002 Matsumoto .................. 429/250

FOREIGN PATENT DOCUMENTS

| JP | 11-144698 | 5/1999 |
| JP | 11-297293 | 10/1999 |
| JP | 2001-076704 | 3/2001 |

* cited by examiner

Primary Examiner—Laura Weiner
(74) Attorney, Agent, or Firm—Hamre, Schulman, Mueller & Larson, P.C.

(57) ABSTRACT

A separator for an alkaline storage battery includes a plurality of polyolefin resins. The polyolefin resins include a first polyolefin resin that is sulfonated, and a second polyolefin resin that is sulfonated. The degree of sulfonation of the first polyolefin resin is different from that of the second polyolefin resin. Thus, a novel separator having high liquid retention properties and high air permeability, and an alkaline storage battery using the same can be obtained.

8 Claims, 4 Drawing Sheets

SEPARATOR FOR ALKALINE STORAGE BATTERY AND ALKALINE STORAGE BATTERY USING THE SAME

BACKGROUND OF THE INVENTION

1. Field of the Invention

The present invention relates to separators for alkaline storage batteries and alkaline storage batteries using the same.

2. Description of the Related Art

In recent years, alkaline storage batteries have been used as power sources for portable information equipment such as cellular phones and notebook computers, electric cars, or hybrid vehicles, and there has been a demand for high performance, in particular long life of alkaline storage batteries. In order to achieve long life of batteries, it is important to ensure the liquid retention properties of a separator, in particular, when pressure is applied to the separator by an electrode plate. In order to improve the liquid retention properties at the time of applying pressure, it is necessary to increase the hydrophilicity and the surface area of the separator.

Conventionally, a separator made of a polyolefin resin that has been subjected to a sulfonation treatment has been used as the separator for alkaline storage batteries. The separator that has been subjected to a sulfonation treatment has excellent properties of suppressing self-discharge. In order to increase the hydrophilicity of this sulfonated separator, it is necessary to increase the degree of sulfonation.

However, when the sulfonation is excessive, the strength of the separator decreases, so that a short-circuit occurs easily.

On the other hand, in order to increase the surface area of a separator, the mass per unit area of a separator is increased, or fine fibers are used. However, these approaches have a problem in that the air permeability of the separator is decreased and the internal pressure is increased. For example, gas produced in a positive electrode at the time of overcharge permeates through the separator and is consumed in a negative electrode, but if the air permeability of the separator is low, this reaction is suppressed so that the internal pressure of the battery is increased. Then, if the internal pressure of the battery is increased to be higher than the pressure of the safety valve, gas inside the battery is released to the outside so that the life of the battery is reduced.

SUMMARY OF THE INVENTION

Therefore, with the foregoing in mind, it is an object of the present invention to provide a novel separator having high liquid retention properties and high air permeability and an alkaline storage battery using the same.

A separator for an alkaline storage battery of the present invention includes a plurality of polyolefin resins. The polyolefin resins include a first polyolefin resin that is sulfonated and a second polyolefin resin that is sulfonated. The degree of sulfonation of the first polyolefin resin is different from that of the second polyolefin resin. In this separator, since the first polyolefin resin and the second polyolefin resin are different in the liquid retention properties, an electrolyte is distributed unevenly. As a result, the resin having a high degree of sulfonation maintains the liquid retention properties, and the air permeability can be improved by the resin having a low degree of sulfonation. Thus, a separator having high liquid retention properties and high air permeability can be obtained. The degree of sulfonation refers to the value obtained by dividing (the number of sulfur atoms contained in a resin) by (the number of carbon atoms contained in the resin), that is, the value given by (degree of sulfonation)=(the number of sulfur atoms contained in a resin)/(the number of carbon atoms contained in the resin).

An alkaline storage battery of the present invention includes a positive electrode, a negative electrode, a separator, and an alkaline electrolyte retained in the positive electrode, the negative electrode and the separator and is characterized in that the separator is the separator for an alkaline storage battery of the present invention.

According to the separator for alkaline storage batteries of the present invention, a novel separator having high liquid retention properties and high air permeability can be obtained. According to the alkaline storage battery of the present invention using the same, an alkaline storage battery having a long life that can be produced easily can be obtained.

DESCRIPTION OF THE PREFERRED EMBODIMENTS

Figure 1:
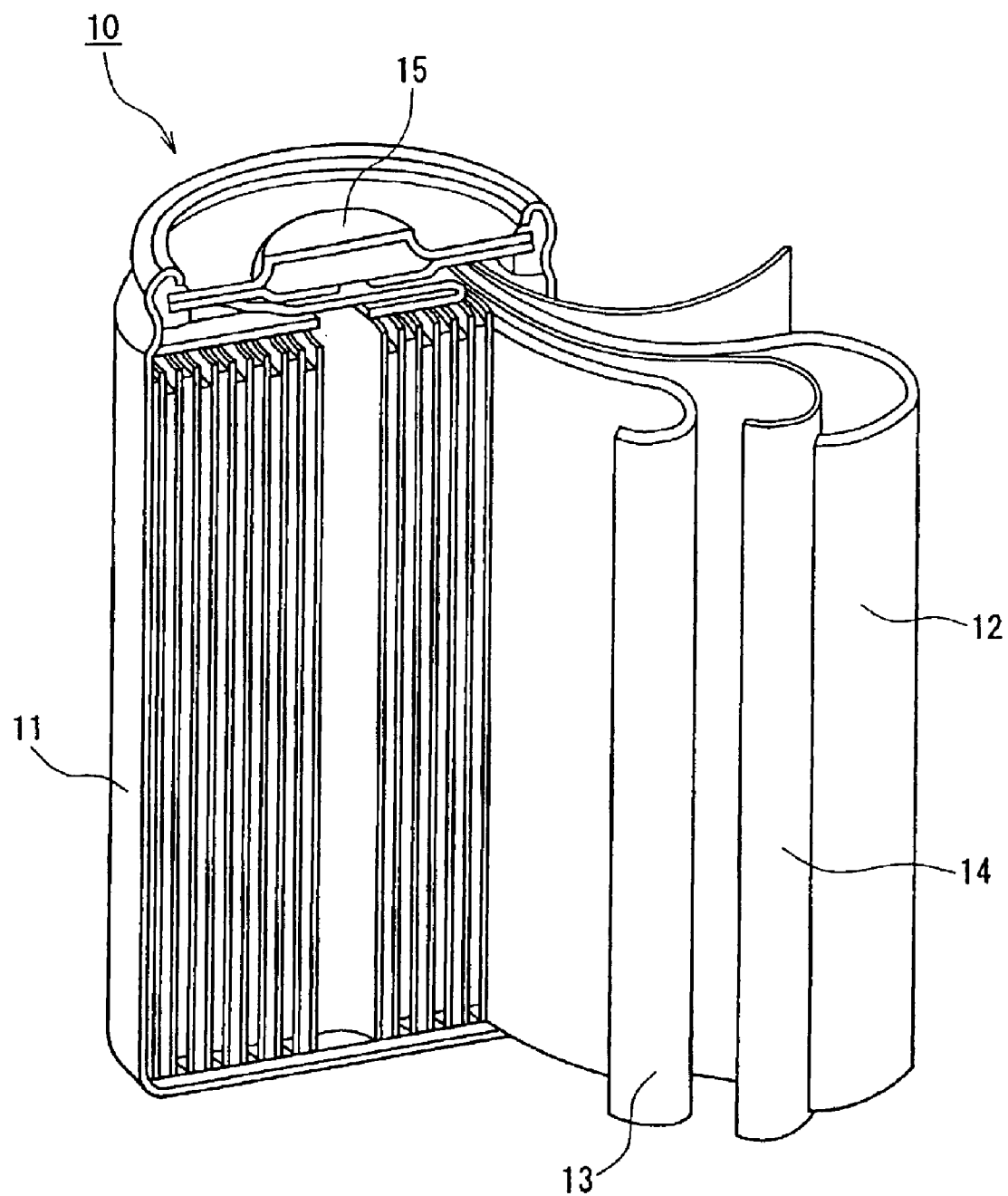
FIG. 1 is a partially exploded perspective view schematically showing an example of an alkaline storage battery of the present invention.

Hereinafter, embodiments of the present invention will be described with reference to the accompanying drawings.

Embodiment 1

In Embodiment 1, a separator of the present invention will be described. The separator of Embodiment 1 includes a plurality of polyolefin resins, and the plurality of polyolefin resins include a first polyolefin resin that is sulfonated and a second polyolefin resin that is sulfonated. The first polyolefin resin that is sulfonated has a different degree of sulfonation from a second polyolefin resin that is sulfonated. The separator of the present invention may include another polyolefin resin that has a different degree of sulfonation, in addition to the first and the second polyolefin resins.

Since this separator has a difference in the hydrophilicity between the first resin and the second resin, electrolyte is distributed unevenly in the separator. As a result, gas produced in an electrode plate at the time of overcharge permeates easily through a portion with less electrolyte, and therefore the internal pressure in the battery can be prevented from increasing. In this separator, the resins having a high degree of sulfonation and a low degree of sulfonation are used, so that the basic fabric strength and the short-circuit resistance can be prevented from deteriorating, and therefore alkaline storage batteries can be produced with high yield.

As the polyolefin resin that can be used for the separator of Embodiment 1, polyethylene resin or polypropylene resin can be used, and resin obtained by combining these resins or resins having a core and sheath structure also can be used. As the resin having a core and sheath structure, for example, polypropylene resin whose surface is coated with polyethylene resin can be used.

Assuming the first polyolefin resin has the lowest degree of sulfonation among the polyolefin resins in the separator, it is preferable that the degree A of sulfonation thereof is $0.5 \times 10^{-3} \leq A \leq 3.0 \times 10^{-3}$. When the degree A of sulfonation is $0.5 \times 10^{-3}$ or more, an increase in the internal resistance and a decrease in the durability can be suppressed. When the degree A of sulfonation is $3.0 \times 10^{-3}$ or less, sufficient air permeability can be obtained.

It is preferable that the content of the first polyolefin resin contained in the separator is in the range from 10 weight % to 80 weight %. With this constitution, a separator having particularly high air permeability can be obtained.

Assuming the second polyolefin resin has the highest degree of sulfonation among the polyolefin resins in the separator, it is preferable that the degree B of sulfonation thereof is $(A+0.5 \times 10^{-3}) \leq B$. With this constitution, a separator having particularly high air permeability can be obtained. When the separator of Embodiment 1 is made only of the first and the second polyolefin resins, the second polyolefin resin has the highest degree of sulfonation in the separator.

The separator of Embodiment 1 can be produced by a regular method. More specifically, nonwoven fabric is formed of resins having different speeds of sulfonation by a regular method, and then a sulfonation treatment can be performed. The degree of sulfonation of polyolefin resin can be changed by various methods. For example, the degree of sulfonation can be changed by sulfonating polyolefin resin having a different degree of crystallization. In this case, using a resin having a low degree of crystallization facilitates sulfonation, which results in a high degree of sulfonation, whereas using a resin having a high degree of crystallization retards sulfonation, which results in a low degree of sulfonation.

Embodiment 2

In Embodiment 2, an alkaline storage battery of the present invention will be described. FIG. 1 (hatching is omitted) is a partially exploded perspective view schematically showing an alkaline storage battery 10 of Embodiment 2. The alkaline storage battery 10 in FIG. 1 includes a case 11, a positive electrode plate 12 enclosed in the case 11, a negative electrode plate 13, a separator 14 disposed between the positive electrode plate 12 and the negative electrode plate 13, an electrolyte (not shown), and a sealing plate 15 provided with a safety valve. The electrolyte is retained in the positive electrode plate 12, the negative electrode plate 13 and the separator 14.

The separator of the present invention as described in Embodiment 1 is used for the separator 14. For the other portions, members that commonly are used for alkaline storage batteries can be used. When the alkaline storage battery 10 is a nickel-hydrogen storage battery, a positive electrode plate containing nickel hydroxide as an active material is used for the positive electrode plate 12, and a negative electrode plate containing a hydrogen-absorbing alloy as a main component can be used for the negative electrode plate 13. For the electrolyte, an alkaline electrolyte containing potassium hydroxide as a main solute can be used. When the alkaline storage battery 10 is a nickel-cadmium storage battery, a negative electrode plate employing cadmium is used for the negative electrode plate 13, which is the difference from the case of the nickel-hydrogen storage battery.

In the alkaline storage batteries 10, it is preferable that the amount C ($cm^3$) of the electrolyte retained in the separator 14 and the volume D ($cm^3$) of voids in the separator 14 satisfy $0.8 \leq C/D < 1$. When the amount of the electrolyte retained in the separator 14 is in this range, the internal resistance can be prevented from increasing. The volume D in the voids in the separator 14 is a value obtained by subtracting the volume of the resins in the separator 14 from the total volume of the separator 14. The volume of the separator 14 including the voids can be calculated by measuring the area and the thickness of the separator. The volume of the resins in the separator 14 can be calculated based on the density of the resins constituting the separator 14 and the mass of the separator 14. "C/D=1" means that all the voids in the separator 14 are filled with an electrolyte.

The cylindrical alkaline storage battery shown in FIG. 1 is only an example, and the form of the alkaline storage battery of the present invention is not limited to that shown in FIG. 1. For example, the alkaline storage battery of the present invention can be applied to those having other forms than a cylindrical shape, such as a rectangular shape.

EXAMPLES

Hereinafter, the present invention will be described more specifically by way of example.

Example 1

In Example 1, separators, each of which was formed of one type of resin, were produced, and the relationship between the degree of sulfonation of the resin and the liquid retention ratio at the time of applying pressure was investigated. For the resin, polyolefin resins having a core and sheath structure having different degrees of sulfonation (polypropylene resin whose surface is coated with polyethylene) were used. In this case, the polyolefin resins having different degrees of sulfonation were produced by preparing a plurality of resins having different degree of crystallization of the polyethylene on the surface and forming nonwoven fabric with respect to each resin, and then performing a sulfonation treatment. The sulfonation treatment was performed by immersing the prepared nonwoven fabric in a fuming sulphuric acid.

Figure 2:
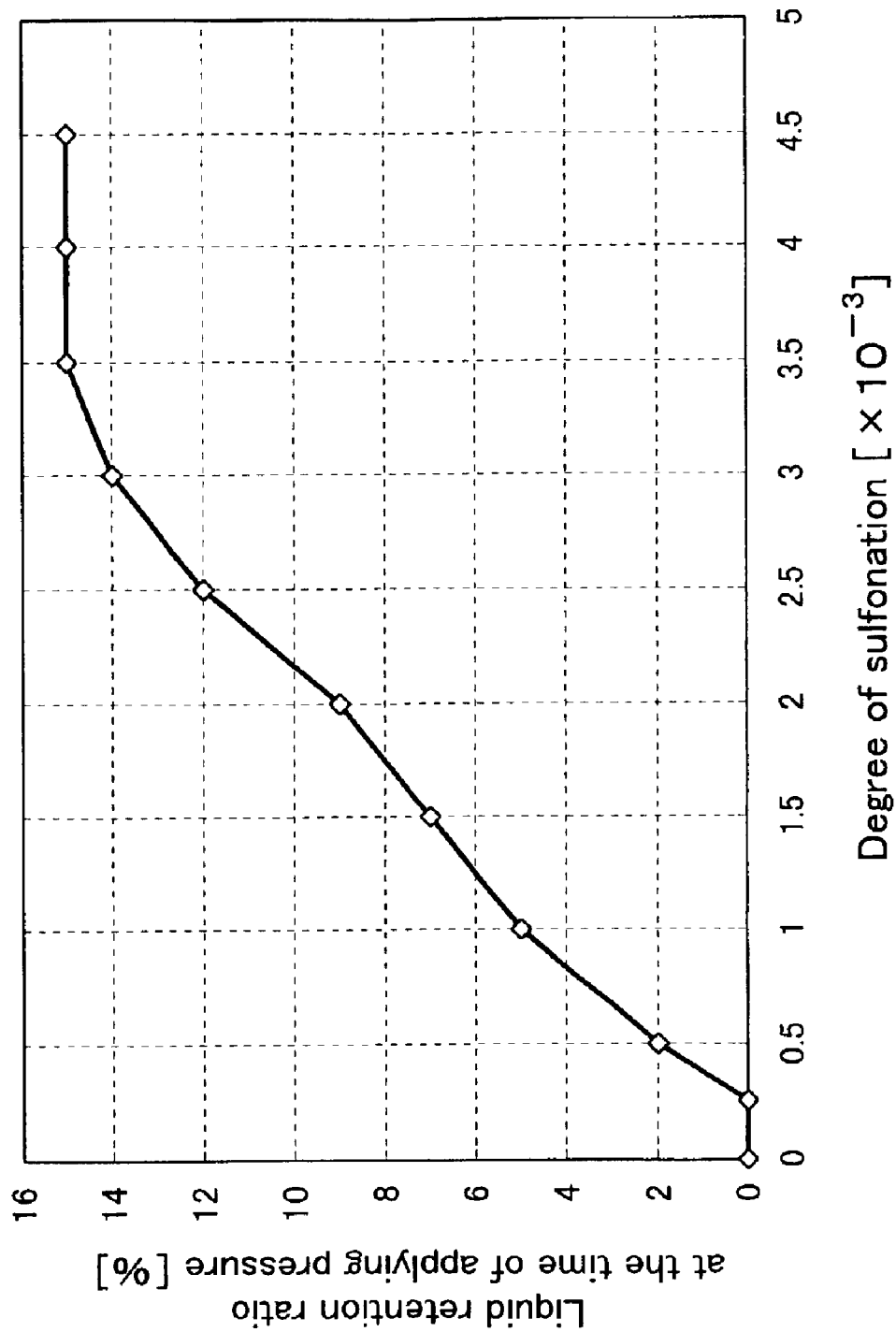
FIG. 2 is a graph showing the relationship between the degree of sulfonation of a resin constituting a separator and the liquid retention ratio at the time of applying pressure.

The liquid retention ratio (%) at the time of applying pressure of the separator is the value given by (the liquid retention ratio (%) at the time of applying pressure)=(the amount (g) of the retained liquid after applying pressure)/(the mass (g) of the separator). The "amount (g) of the retained liquid after applying pressure" refers to the mass (excluding the mass of the separator) of the electrolyte retained in the separator after applying pressure. The "mass of the separator" refers to the mass of the separator that does not include the electrolyte. The amount of the retained liquid after applying pressure was measured as follows. First, two filter papers were disposed above and under the separator that was wetted sufficiently with an electrolyte (an alkaline aqueous solution containing potassium hydroxide as a main solute and having a relative density of 1.3) and a pressure of 490 $N/cm^2$ (50 $kgf/cm^2$) was applied to the entire filter papers for 30 seconds. Next, the amount of the retained liquid (the mass of the electrolyte retained in the separator) was measured. FIG. 2 shows the measurement results.

As shown in FIG. 2, in the case where the degree of sulfonation is less than $0.5 \times 10^{-3}$, the electrolyte was not retained when pressure is applied. In the case where the degree of sulfonation was in the range from $0.5 \times 10^{-3}$ to $3.5 \times 10^{-3}$, the liquid retention ratio increased linearly.

Furthermore, in the case where the degree of sulfonation was $3.5\times10^{-3}$ or more, the liquid retention ratio at the time of applying pressure was saturated so that there was no change. In the case where the degree of sulfonation is 0, the separator repels liquid completely, so that when a battery is produced with this separator, the power of the battery is reduced significantly.

Example 2

In Example 2, a first resin having a low degree of sulfonation and a second resin having a higher degree of sulfonation were mixed so as to produce a plurality of separators. In this case, the plurality of separators were produced by changing the degree of sulfonation of the second resin. Then, D size (capacity of 6.5 Ah) nickel-hydrogen storage batteries were produced with the produced separators, and the initial internal pressure of the battery (the internal pressure of the battery when the battery was charged at a current value of 2.6 A (0.4 C) in a 25° C. environment until the SOC reached 120%) was measured.

The degree of sulfonation of the first resin, which is a material of the separator, is fixed to $2.0\times10^{-3}$ and the degree of sulfonation of the second resin was changed in the range from $2.2\times10^{-3}$ to $4.5\times10^{-3}$. Both the first and the second resins were obtained by sulfonating resin having a core and sheath structure (polypropylene resin whose surface is coated with polyethylene), and the degree of sulfonation was changed by changing the degree of crystallization of the polyethylene on the surface. Table 1 shows the degree of sulfonation of the first and the second resins with respect to each sample. The first and the second resins were mixed at a mass ratio of 25:75.

TABLE 1

| Sample | First resin Sulfonation degree [×10⁻³] | Second resin Sulfonation degree [×10⁻³] |
|---|---|---|
| a | 2.0 | 2.2 |
| b |  | 2.5 |
| c |  | 3.0 |
| d |  | 3.5 |
| e |  | 4.5 |

Figure 3:
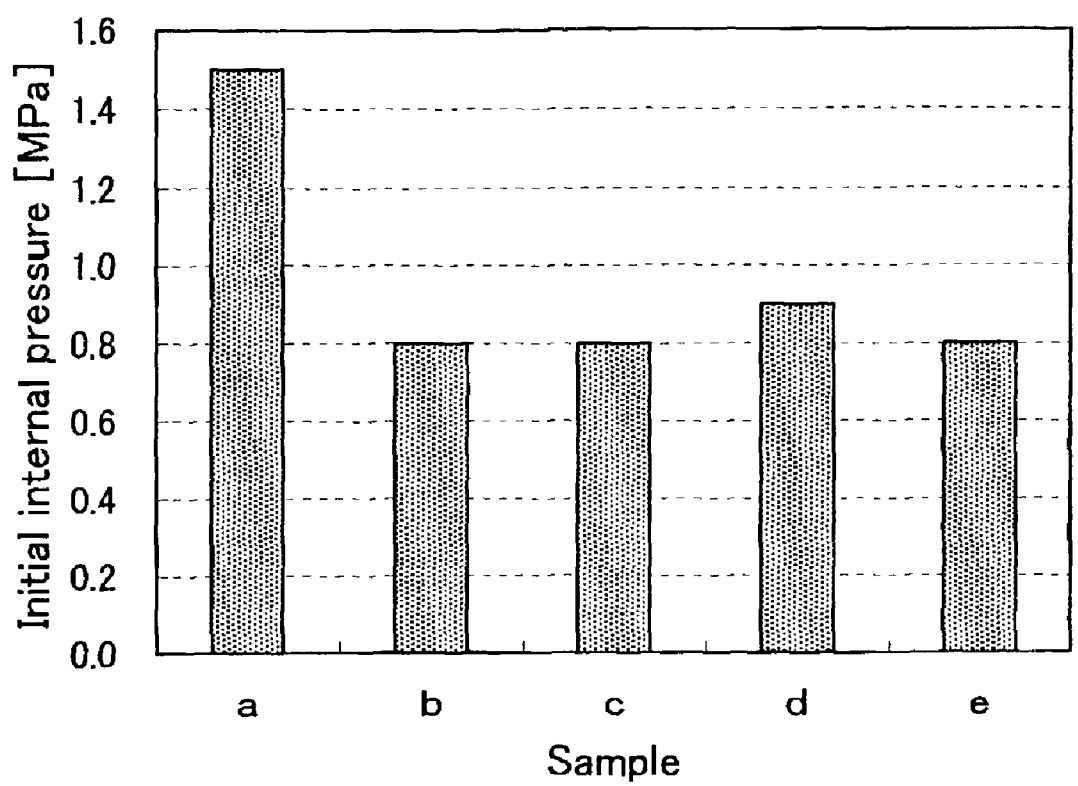
FIG. 3 is a graph showing an example of the initial internal pressure with respect to batteries using separators made of resins having different degrees of sulfonation.

D size (capacity of 6.5 Ah) nickel-hydrogen storage batteries were produced with the separators shown in Table 1. More specifically, batteries were produced with a positive electrode containing nickel hydroxide as a main component, a negative electrode containing a hydrogen-absorbing alloy as a main component, and an electrolyte made of an alkaline aqueous solution having a relative density of 1.3 and containing potassium hydroxide as a main solute. Then, the initial internal pressure was measured with respect to the obtained batteries. FIG. 3 shows the measurement results. As seen from FIG. 3, the initial internal pressure of sample a was high, whereas the initial internal pressures of samples b to e were low. Therefore, it is preferable that the difference in the degree of sulfonation between the first resin and the second resin is $0.5\times10^{-3}$ or more. However, in view of the results of Example 1, it seems that when the degree of sulfonation of the first resin is $3.5\times10^{-3}$ or more, uneven distribution of the electrolyte does not occur because there is little difference in the liquid retention properties. Therefore, it is preferable that the degree A of sulfonation of the first resin having a low degree of sulfonation is $0.5\times10^{-3}\leq A\leq 3.0\times10^{-3}$ and it is preferable that the degree B of sulfonation of the second resin is $(A+0.5\times10^{-3})\leq B$.

Example 3

In Example 3, a first resin having a low degree of sulfonation and a resin having the highest degree of sulfonation were mixed at varied mixing ratio so as to produce a plurality of separators. Then, D size (capacity of 6.5 Ah) nickel-hydrogen storage batteries were produced with the produced separators in the same manner as in Example 2, and the initial internal pressure of the battery was measured.

The degree of sulfonation of the first resin, which is a material of the separator, is fixed to $2.0\times10^{-3}$ and the degree of sulfonation of the second resin was changed in the range from $3.1\times10^{-3}$ to $12.0\times10^{-3}$. Both the first and the second resins were obtained by sulfonating resin having a core and sheath structure (polypropylene resin whose surface is coated with polyethylene), and the degree of sulfonation was changed by changing the degree of crystallization of the polyethylene on the surface. Furthermore, in Example 3, the mixing ratio of the first resin and the second resin was changed so as to produce seven separators. Table 2 shows the degree of sulfonation of the first and the second resins and the mixing ratio with respect to each sample.

TABLE 2

| | First resin | | Second resin | |
|---|---|---|---|---|
| Sample | Sulfonation degree [×10⁻³] | Mixing ratio [wt %] | Sulfonation degree [×10⁻³] | Mixing ratio [wt %] |
| F | 2.0 | 5 | 3.1 | 95 |
| G |  | 10 | 3.1 | 90 |
| H |  | 25 | 3.3 | 75 |
| I |  | 50 | 4.0 | 50 |
| J |  | 75 | 6.0 | 25 |
| K |  | 80 | 7.0 | 20 |
| L |  | 90 | 12.0 | 10 |

Figure 4:
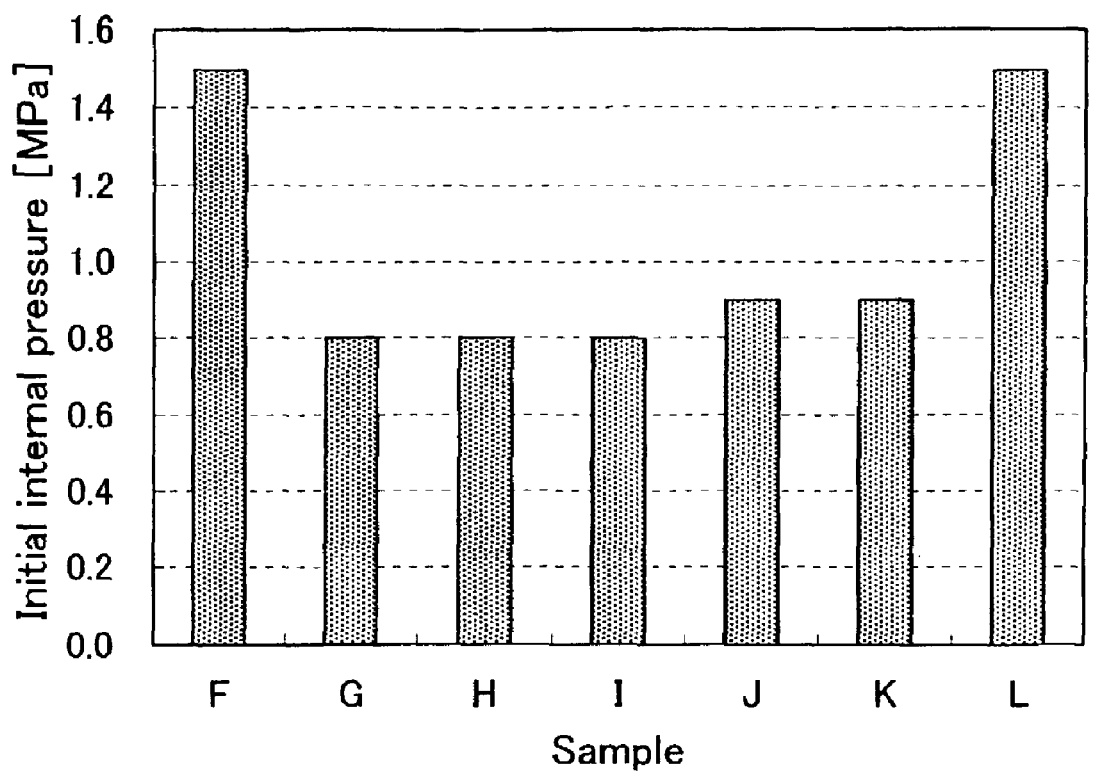
FIG. 4 is a graph showing another example of the initial internal pressure with respect to batteries using separators made of resins having different degrees of sulfonation.

Nickel-hydrogen storage batteries were produced with the separators shown in Table 2, and the initial internal pressure was measured. FIG. 4 shows the measurement results. As seen from FIG. 4, the initial pressure of samples F and L were high. This seems to be because the amount of the first resin having low liquid retention properties is too small in the sample F, and the amount of the first resin having low liquid retention properties is too much in the sample L (i.e., the amount of the second resin having high liquid retention properties is too small). On the other hand, the initial internal pressures of samples G to K were low. Therefore, it is preferable that the content of the resin having the lowest degree of sulfonation in the resins in the separator is in the range from 10 weight % to 80 weight %.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A separator for an alkaline storage battery comprising a plurality of polyolefin rains, wherein
   the polyolefin resins include a first polyolefin resin that is sulfonated, and a second polyolefin resin that is sulfonated, and
   a degree of sulfonation of the first polyolefin resin is different from that of the second polyolefin resin, and wherein the first polyolefin resin has a lowest degree of sulfonation among the polyolefin resins contained in the separator, and a degree A of sulfonation thereof satisfies $0.5 \times 10^{-3} \leq A \leq 3.0 \times 10^{-3}$.

2. The separator for an alkaline storage battery according to claim 1, wherein the second polyolefin resin has a highest degree of sulfonation among the polyolefin resins contained in the separator, and a degree B of sulfonation thereof and the degree A of sulfonation satisfy $(A+0.5 \times 10^{-3}) \leq B$.

3. The separator for an alkaline storage battery according to claim 1, wherein a content of the first polyolefin resin is in a range from 10 weight % to 80 weight %.

4. An alkaline storage battery comprising a positive electrode, a negative electrode, a separator, and an alkaline electrolyte retained in the positive electrode, the negative electrode and the separator, wherein the separator comprises polyolefin resins, the polyolefin resins include a first polyolefin resin that is sulfonated, and a second polyolefin resin that is sulfonated, and a degree of sulfonation of the first polyolefin resin is different from that of the second polyolefin, and wherein the first polyolefin resin has a lowest degree of sulfonation among the polyolefin resins contained in the separator, and a degree A of sulfonation thereof satisfies $0.5 \times 10^{-3} \leq A \leq 3.0 \times 10^{-3}$.

5. The alkaline storage battery according to claim 4, wherein the second polyolefin resin has a highest degree of sulfonation among the polyolefin resins contained in the separator, and a degree B of sulfonation thereof and the degree A of sulfonation satisfy $(A+0.5 \times 10^{-3}) \leq B$.

6. The alkaline storage battery according to claim 4, wherein a content of the first polyolefin resin in the separator is in a range from 10 weight % to 80 weight %.

7. The alkaline storage battery according to claim 4, wherein an amount C ($cm^3$) of the electrolyte retained in the separator and a volume D ($cm^3$) of voids in the separator satisfy $0.8 \leq C/D < 1$.

8. An alkaline storage battery comprising a positive electrode, a negative electrode, a separator, and an alkaline electrolyte retained in the positive electrode, the negative electrode and the separator, wherein the separator comprises polyolefin resins, the polyolefin resins include a first polyolefin resin that is sulfonated, and a second polyolefin resin that is sulfonated, and a degree of sulfonation of the first polyolefin resin is different from that of the second polyolefin, and wherein an amount C ($cm^3$) of the electrolyte retained in the separator and a volume D ($cm^3$) of voids in the separator satisfy $0.8 \leq C/D < 1$.

* * * * *